United States Patent
Takase et al.

(10) Patent No.: US 9,874,912 B2
(45) Date of Patent: Jan. 23, 2018

(54) CONTROLLING ENERGIZING RANGE OF MOBILE ELECTRONIC DEVICE

(71) Applicant: Lenovo (Singapore) Pte. Ltd., Singapore (SG)

(72) Inventors: Yoshihiro Takase, Kanagawa-ken (JP); Yasumichi Tsukamoto, Kanagawa-ken (JP); Shinji Ohishi, Kanagawa-ken (JP); Yuichiro Seto, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 219 days.

(21) Appl. No.: 14/184,225

(22) Filed: Feb. 19, 2014

(65) Prior Publication Data
US 2014/0237271 A1    Aug. 21, 2014

(30) Foreign Application Priority Data
Feb. 20, 2013   (JP) ................................ 2013-030595

(51) Int. Cl.
*G06F 1/26*   (2006.01)
(52) U.S. Cl.
CPC .................... *G06F 1/263* (2013.01)
(58) Field of Classification Search
None
See application file for complete search history.

(56) References Cited

U.S. PATENT DOCUMENTS

| | | | | |
|---|---|---|---|---|
| 5,375,246 A | * | 12/1994 | Kimura | ...................... G06F 1/30 365/226 |
| 5,739,596 A | * | 4/1998 | Takizawa | ................. G06F 1/263 307/64 |
| 5,784,626 A | * | 7/1998 | Odaohara | ................. H02J 1/10 307/66 |
| 7,057,306 B2 | * | 6/2006 | Belschner | ........... B60L 11/1881 307/9.1 |
| 2005/0031368 A1 | * | 2/2005 | Han | .................... G03G 15/5004 399/88 |
| 2007/0172056 A1 | * | 7/2007 | Nakanishi | ............... G06F 21/86 380/210 |
| 2008/0148074 A1 | * | 6/2008 | Chang | ..................... G06F 1/325 713/300 |

(Continued)

FOREIGN PATENT DOCUMENTS

| | | |
|---|---|---|
| JP | H11008939 A | 1/1999 |
| JP | H08336241 A | 12/1999 |

(Continued)

*Primary Examiner* — Paul J Yen
(74) *Attorney, Agent, or Firm* — Ference & Associates LLC

(57) ABSTRACT

An energization range of a laptop PC is controlled for safety component replacement. An EC can communicate with a battery unit to control a FET of the battery unit. In a power-off state, a PWC receives electricity from the battery unit or an AC/DC adapter. In the power-off state, a system of the EC stops. When a housing cover of the laptop PC is opened, a cover switch turns ON. When a logic circuit detects the operation of the cover switch, the PWC controls a DC/DC converter group to activate the system. The EC receiving electricity turns the FET OFF. Then the PWC turns the FET OFF.

20 Claims, 9 Drawing Sheets

(56) References Cited

U.S. PATENT DOCUMENTS

| | | | | |
|---|---|---|---|---|
| 2012/0075106 A1* | 3/2012 | Chen | ............... | G06F 1/30 340/636.15 |
| 2013/0021090 A1* | 1/2013 | Robertson | ............ | G06F 1/26 327/538 |
| 2013/0111243 A1* | 5/2013 | Barnette | ............ | G06F 1/28 713/323 |

FOREIGN PATENT DOCUMENTS

| | | | |
|---|---|---|---|
| JP | 2001341085 A | 12/2001 |
| JP | 2004148724 A | 5/2004 |
| JP | 2008052725 A | 3/2008 |
| JP | 2010218224 A | 9/2010 |

* cited by examiner

CONTROLLING ENERGIZING RANGE OF MOBILE ELECTRONIC DEVICE

CLAIM FOR PRIORITY

This application claims priority to Japanese Patent Application No. 2013-030595, filed on Feb. 20, 2013, which is fully incorporated by reference herein.

FIELD

The subject matter described herein relates to a technique to ensure the security during an operation to open a cover of a mobile electronic device and replace a component, and relates to a technique to ensure the security during an operation to replace a component of a mobile electronic device having an internal battery.

BACKGROUND

Mobile computers such as a laptop personal computer (laptop PC) and a tablet-type computer (tablet PC) are equipped with a rechargeable battery. Laptop PCs often include a battery pack that is detachable at a bay of a housing thereof, among which a thin mobile computer such as a laptop PC called Ultrabook® or a tablet PC often uses an internal battery stored in the housing.

Replacing of such an internal battery of a mobile computer needs to open a cover of the housing. In addition to the internal battery, some other electronic devices such as a processor and a main memory may be replaced while letting the cover of the housing open. Even after shifting a mobile computer to a soft-off state or a power-off state (S5 state of ACPI) using a power button or a GUI thereof, electricity is still supplied from an AC/DC adapter or a battery to a device necessary to start up a power supply.

It is then necessary to, prior to opening of the housing for replacement of a component, remove the AC/DC adapter and then stop power supply from the battery to stop all power supplies other than a RTC, thus preventing damage due to short circuit. ACPI defines such a state as a mechanical-off state (G3 state). A mobile computer coming with a battery pack can easily shift to the G3 state by removing an AC/DC adapter and the battery pack therefrom.

On the other hand, in the case of a mobile computer coming with an internal battery, the internal battery cannot be removed without opening the housing. Then the mobile computer is powered on and a switch incorporated in the internal battery is turned off via a setup screen of the BIOS, thus shifting the mobile computer to a mechanical-off state. Japanese Patent application publication No. 2004-148724 discloses an image formation apparatus that is configured to shut down a power supply when the cover thereof is opened.

BRIEF SUMMARY

In summary, one aspect provides an electronic device, comprising: a housing; a detachable housing cover; a first control circuit; the first control circuit connectable to a DC-side switch of a battery, wherein the DC-side switch controls the electricity supplied to the device via the battery; a cover switch that detects the opening of the detachable housing cover with respect to the housing; and a startup power supply that supplies electricity from the battery to the first control circuit, wherein the first control circuit shifts the DC-side switch to an OFF position when electricity is received from the startup power supply in response to the operation of the cover switch.

Another aspect provides a method, comprising: detecting a DC-side switch of a battery unit is mounted to a housing of an electronic device; the battery unit supplying power that operates a first control circuit of the electronic device; and operating, in response to operation of a cover switch of the electronic device, the first control circuit to shift the DC-side switch to an OFF position when startup power is received from the battery unit.

A further aspect provides an electronic device, comprising: a housing; a detachable housing cover; a battery unit connected to the housing; a first control circuit; the first control circuit connectable to a DC-side switch of the battery unit, wherein the DC-side switch controls the electricity supplied to the device via the battery unit; a cover switch that detects the opening of the detachable housing cover with respect to the housing; and a startup power supply that supplies electricity from the battery unit to the first control circuit, wherein the first control circuit shifts the DC-side switch to an OFF position when electricity is received from the startup power supply in response to the operation of the cover switch.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1A:
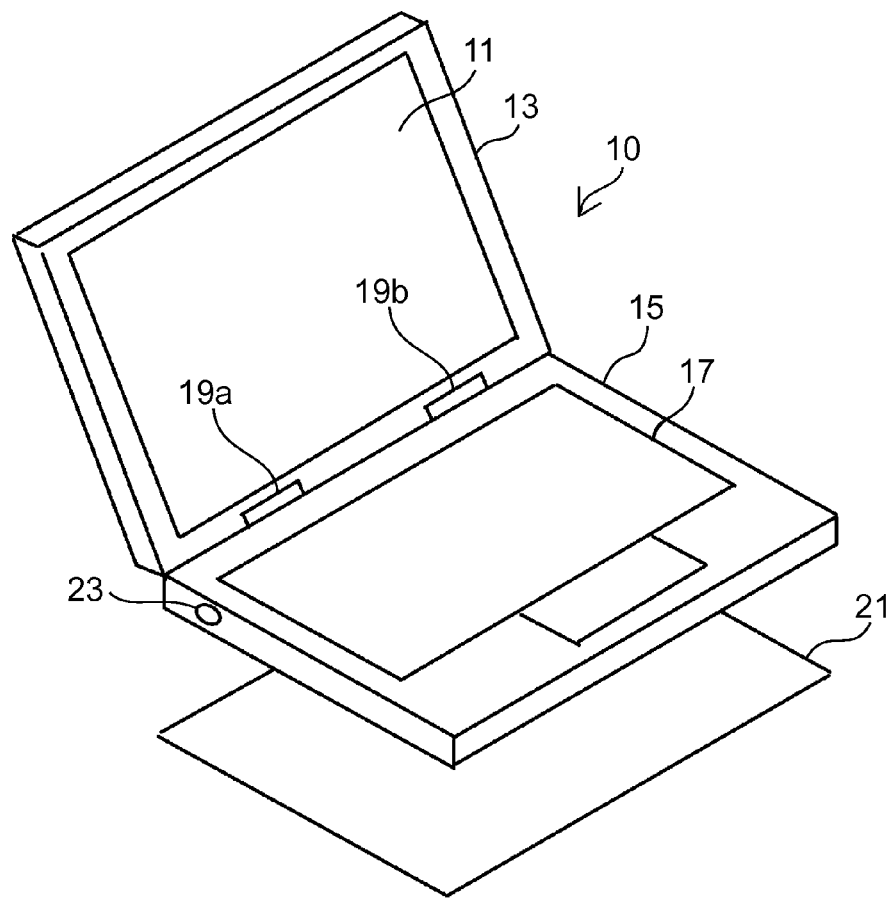
FIG. 1(A-B) shows a state where a bottom cover 21 of a laptop PC 10 is opened.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An operation to shift the mobile computer to a mechanical-off state via the setup screen of the BIOS is sometimes skipped because the user is not familiar with such an operation, the user erroneously recognizes S5 state as safety, or the user feels the operation troublesome. The user may open the housing of the computer, to which an AC/DC adapter is still connected. Therefore in the state where the AC/DC adapter is disconnected, the computer desirably shifts automatically to a mechanical-off state when the operator opens the housing.

When the user opens the housing of the PC, to which the AC/DC adapter is connected, the energization range is desirably minimized automatically. Such control is performed desirably so as to minimize devices added or a change in circuit by utilizing hardware the laptop PC already comes with. It is further desirable that the PC in the housing-open state can shift to a power-on state so as to enable checking of a result of component replacement. In order to meet such needs, an embodiment provides a method to ensure the security during replacement of a component of a mobile electronic device.

Thus, an embodiment provides a method to control the energization range of a mobile electronic device when the housing cover of the device is opened. An embodiment provides a method to ensure the security during replacement of a component of a mobile electronic device. An embodiment provides a method to ensure the security during component replacement while ensuring the reliability of power supply. An embodiment provides a method to ensure the security during component replacement while minimizing a change of the existing hardware. An embodiment provides a mobile computer to implement such methods.

A mobile electronic device according to an embodiment includes a detachable housing cover enabling a component replacement operation by a user. A battery unit comes with a DC-side switch to control electricity supplied to a system. When the DC-side switch is controlled to be OFF, energization of the system by the battery unit can be completely stopped. A first control circuit controls the DC-side switch. When a cover switch detects opening of the housing cover, a startup power supply supplies electricity supplied from the battery unit to the first control circuit. When the first control circuit receives electricity from the startup power supply that is activated in response to an operation of the cover switch, the first control circuit controls the DC-side switch to be OFF.

With this configuration, when the housing cover is opened, electricity from the battery unit to the system is stopped to ensure the security for component replacement. When electricity of the first control circuit is stopped while turning the DC-side switch ON and letting the system to be a power-off state, the first control circuit controls the DC-side switch to be OFF in response to the operation of the cover switch, and so the system can transit to a power state having a much narrower energization range than that of the power-off state.

The battery unit may be an internal type stored inside of a housing or a battery pack mountable to a bay of the housing. The DC-side switch of the battery unit is usually in an ON-state, and a user may turn it OFF via software of the system only when needed. In the an embodiment, even when the user does not turn the DC-side switch OFF, the DC-side switch automatically can turn OFF before opening the housing cover, and so the security to replace a component in the mobile electronic device storing an internal type battery unit can be ensured with reliability. The battery pack can be removed from the bay easily, and even when the housing cover opens without being removed, the DC-side switch can be controlled automatically to be OFF to ensure the security.

The mobile electronic device may include: an external power supply terminal for connection of an external power supply to supply electricity to the system; and an AC-side switch connected to the external power supply terminal to control electricity that the external power supply supplies to the system. The AC-side switch shifts to an OFF state in response to an operation of the cover switch, whereby an energization range of the system can be limited also when the external power supply is connected.

The mobile electronic device further may include a second control circuit that receives electricity from the external power supply connected to the external power supply terminal when the AC-side switch is OFF, and activates the startup power supply in response to an operation of the cover switch. In this case, when both of the AC-side switch and the DC-side switch are OFF, they can be controlled to be ON via the second control circuit. While the housing cover is open and the external power supply is removed, when a battery unit including the DC-side switch in an ON state is mounted, the first control circuit can control the DC-side switch to be OFF. As a result, when a battery unit including the DC-side switch in an ON state is carelessly mounted, the system is instantly energized, but immediately the DC-side switch can be in an OFF state to ensure the safety.

When the external power supply is not connected while the housing cover is open and a battery unit including the DC-side switch in an OFF state is mounted, and subsequently when the external power supply is connected, the second control circuit can control the AC-side switch to be ON. This can supply electricity to the system, so that the first control circuit can control the DC-side switch to be ON. When the external power supply is connected while the housing cover is open, and when the external power supply is subsequently removed and is then connected again for power-on-reset, the second control circuit can control the AC-side switch to be ON. This can supply electricity to the system simply by a reset operation of the external power supply, and the AC-side switch and the DC-side switch can be returned to ON, and so there is no need to add hardware for reset.

An embodiment provides a method for controlling a power state of a mobile computer configured to receive electricity from a battery unit and include a controller capable of controlling an output of the battery unit. The method includes the steps of: making a system transit to a power-off state to stop electricity to the controller; detecting opening of a housing cover of the mobile computer; in response to the detection, supplying electricity to the controller from the battery unit; stopping an output from the battery unit by the controller; and making the system transit to a mechanical-off state having a narrower energization range than that of the power-off state.

This allows the system to automatically transit to be a state having a much narrower energization range than that of the power-off state when the housing cover is opened. When an AC/DC adapter can be connected to the mobile computer, the mechanical-off state includes a first mechanical-off state and a second mechanical-off state having a wider energization range than that of the first mechanical-off state. When an output of the battery unit stops and the AC/DC adapter is connected, the system can transit to the second mechanical-off state, and when an output of the battery unit stops and the AC/DC adapter is removed, the system can transit to the first mechanical-off state.

The first mechanical-off state can be the G3 state of ACPI, and the second mechanical-off state can be a state where electricity is supplied to a power controller that controls the AC-side switch that supplies electricity from the AC/DC adapter to the system. This allows the system in the first mechanical-off state to return to the power-off state via the second mechanical-off state.

In the power-off state, the AC/DC adapter is connected, and a DC-side switch to control an output of the battery unit shifts to ON. When the system returns to the power-off state, then the system can transit to the power-on state by a normal operation to press the power button. While the housing cover is open and the system transits to the first mechanical-off state, when the AC/DC adapter is connected, the system can transit to the power-off state. While the housing cover is open and the system transits to the second mechanical-off state, when the AC/DC adapter is removed and connected again, the system can transit to the power-off state. In any case, the system can be controlled to be a power-off state simply by connecting/removing the AC/DC adapter.

Figure 1B:
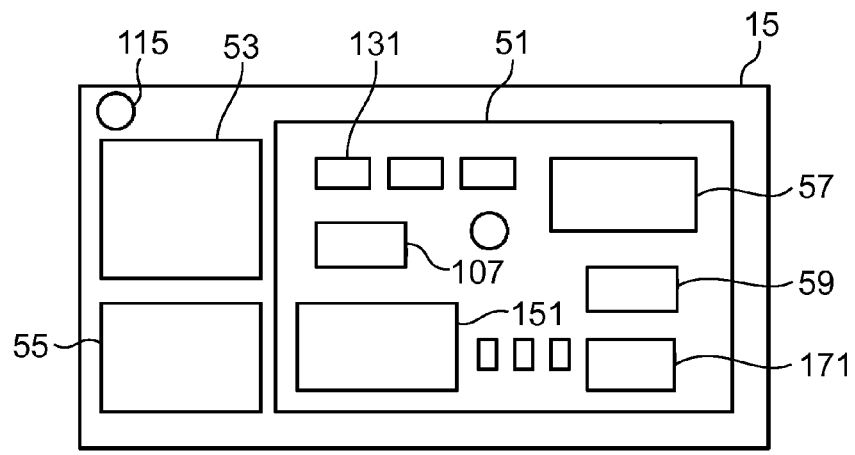
Figure 2:
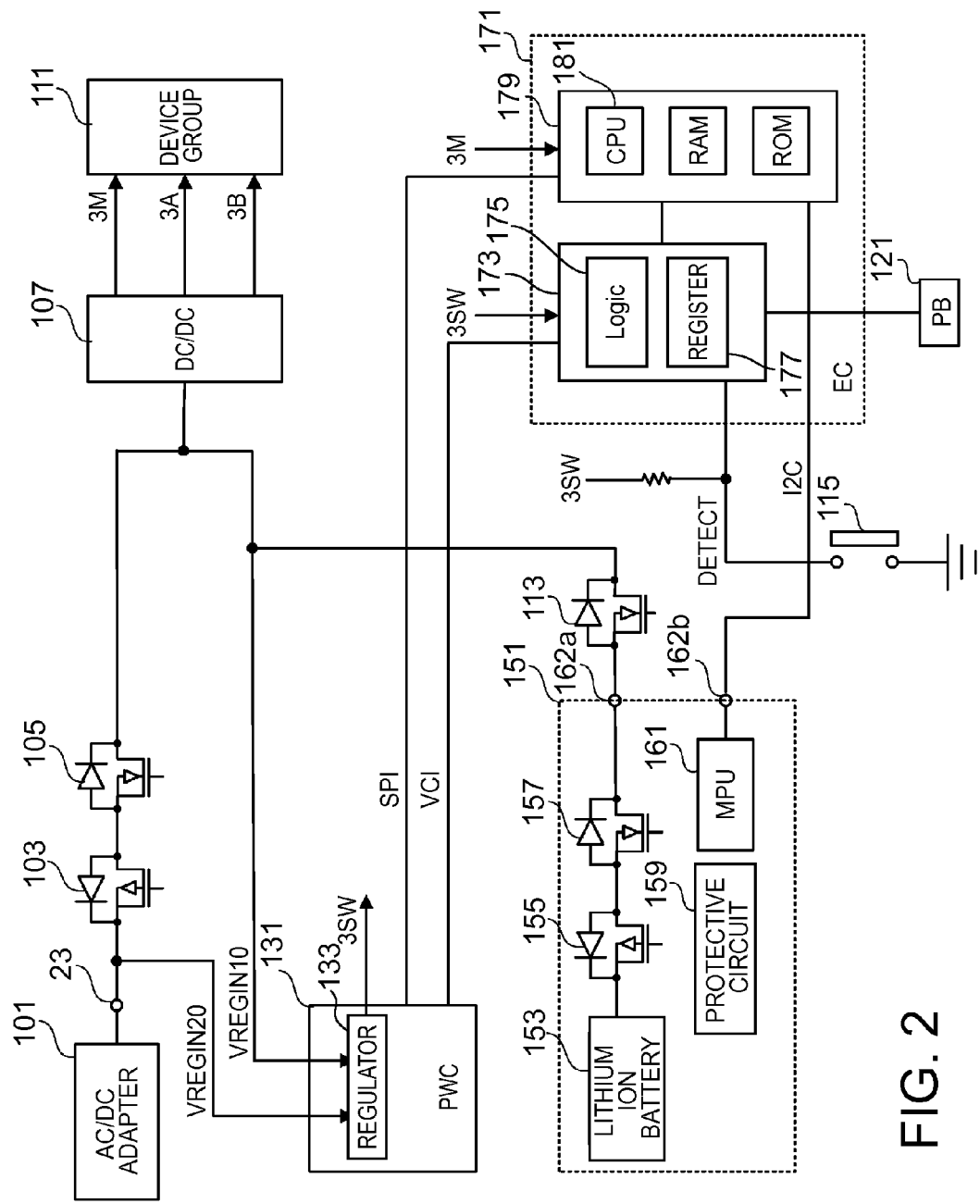
FIG. 2 is a functional block diagram of an electricity system of the laptop PC 10.

FIG. 1A is a perspective view of the outer shape of a laptop PC 10, and FIG. 1B is a bottom view of the interior of a system housing 15, from which a bottom cover 21 is removed. FIG. 2 is a functional block diagram of an electricity system of the laptop PC 10. The laptop PC 10 includes a display housing 13 mounting a display 11 and the system housing 15 mounting a keyboard 17 at the surface and storing a lot of devices internally, the display housing 13 and the system housing 15 being coupled to be openable/closable via hinge mechanisms 19a and 19b. The system housing 15 has a side face, to which a power supply jack 23 is attached for connection to an AC/DC adapter 101.

The system housing 15 has a bottom face, to which the bottom cover 21 is attached with screws. When the bottom cover 21 is removed, a mother board 51, a HDD 53, a radiating fan 55 and the like are exposed. The mother board 51 includes a CPU 57, a chip set 59, an embedded controller (EC) 171, a DC/DC converter group 107, a power controller (PWC) 131, a battery unit 151 and the like mounted thereon.

The system housing 15 includes a cover switch 115 attached thereto, the cover switch 115 having a contact that is closed when the bottom cover 21 is opened. The cover switch 115 may be any type including a magnetic sensor, an electrostatic capacitance sensor or a mechanical switch as long as it can detect whether the bottom cover 21 and the system housing 15 are in close contact or are separated.

After removing the bottom cover 21 from the laptop PC 10, a user or a specialist can replace a device stored in the system housing 15. Especially unlike a battery pack attached to a bay of the system housing 15, replacement of the battery unit 151 always requires the removal of the bottom cover 21 before the replacement. In FIG. 2, a FET 103 to stop power supply and a FET 105 to prevent electricity backflow from the battery unit 151 are connected in series to the power supply jack 23.

The AC/DC adapter 101 supplies electricity to all devices mounted at the laptop PC 10 as well as charges the battery unit 151. FIG. 2 omits the illustration of a charging circuit. The output of the AC/DC adapter 101 and the output of the battery unit 151 are connected to the primary side of the DC/DC converter group 107 via a common line, where the AC/DC adapter 101 has higher voltage than the battery unit 151, and so when charging to the battery unit 151 ends, the AC/DC adapter 101 still supplies electricity to all devices.

The secondary side of the FET 105 is connected to the primary side of the DC/DC converter group 107. The DC/DC converter group 107 includes a plurality of switching regulators, thus generating a plurality of levels of voltage that the laptop PC 10 uses. The DC/DC converter group 107 outputs electricity to a 3M system, a 3A system and a 3B system depending on the power state of the laptop PC 10. The 3M system, the 3A system and the 3B system are connected to a device group 111. The device group 111 includes a plurality of devices such as the CPU 57, the chip set 59, the EC 171, the PWC 131 and the HDD 53.

The PWC 131 includes a CPU, a RAM, a ROM and a linear regulator 133. The PWC 131 controls the operation of the FETs 103, 105 and 113 and the DC/DC converter group 107. When the AC/DC adapter 101 is not connected, the FETs 103 and 105 shift to OFF because electrical potential at their gates is lost. Hereinafter the state where the AC/DC adapter 101 having the primary side connected to an outlet of an AC power supply supplies electricity to the laptop PC 10 via the power supply jack 23 simply refers to connection of the AC/DC adapter 101.

The linear regulator 133 receives electricity from the AC/DC adapter 101 via a VREGIN20 line, and receives electricity from the battery unit 151 via a VREGIN10 line. When the linear regulator 133 receives electricity from any one of the AC/DC adapter 101 and the battery unit 151, the linear regulator 133 outputs electricity along a 3SW system with a predetermined stable voltage value. While the linear regulator 133 receives electricity from the AC/DC adapter 101, if the AC/DC adapter 101 is removed, the electricity supply is switched uninterruptibly so that the linear regulator 133 can receive electricity from the battery unit 151.

While the linear regulator 133 receives electricity from the battery unit 151, when the AC/DC adapter 101 is connected, the electricity supply is switched uninterruptibly so that the linear regulator 133 can receive electricity from the AC/DC adapter 101. The PWC 131 receives electricity from the linear regulator 133 for operation. When the electricity supply from both of the AC/DC adapter 101 and the battery unit 151 stops and then electricity is supplied from one of them, the PWC 131 performs a power-on-reset operation to turn the FETs 103 and 105 ON.

The 3SW system is to supply electricity to devices necessary to start a power supply, including a hardware block 173 of the EC 171 and a lid sensor (not illustrated). The 3M system is to supply electricity to devices that are activated when the AC/DC adapter 101 is connected and stop when the AC/DC adapter 101 is removed, including a programmable block 179 of the EC 171. The 3A system is to supply electricity to devices that become activated at the power state of the suspend state or higher. The 3B system is to supply electricity to devices that are activated in the power-on state.

The EC 171 includes the hardware block 173 made up of a hardware logic circuit 175, a register 177 and the like, and the programmable block 179 made up of a CPU 181, a RAM, a ROM and the like. The hardware block 173 is connected to a DETECT line leading to the ground via the cover switch 115. The cover switch 115 is a normal open mode type switch having a contact that is closed when the bottom cover 21 is opened. The hardware block 173 is further connected to a power button 121 to start a power supply.

The DETECT line is in the pull-up state by a power supply of the 3SW system via a resistance. The logic circuit 175 controls the power supply when the bottom cover 21 is opened, and the register 177 stores the logic state of the DETECT line. The programmable block 179 is a microcomputer that can run a program about the management of a temperature inside the laptop PC 10 or the electricity independently of the CPU 57. The programmable block 179 controls the operations of the DC/DC converter group 107, the FETs 103, 105 and 113 and the like. The PWC 131 is connected to the programmable block 179 of the EC 171 via a SPI bus and is connected to the hardware block 173 via a VCI line.

The battery unit 151 includes a lithium-ion type battery cell 153, a protective circuit 159, a MPU 161 and the like. The output of the battery cell 153 is connected to a FET 113 via a FET 155 for discharge control and a FET 157 for charge control that are connected in series. The surface of the battery unit 151 is protected by a soft insulation sheet, and so when the FET 155 is turned off, the battery unit 151, even stored in the laptop PC 10, becomes a state corresponding to the state of a battery pack removed from a bay in terms of safety.

The MPU 161 is connected to the programmable block 179 of the EC 171 via an I2C bus. The MPU 161 controls the operations of the FETs 155 and 157 when the protective circuit 159 becomes activated and when the MPU 161 receives a command from the programmable block 179 via the I2C bus, for example. The FET 113 is connected between the output terminal of the battery unit 151 and the primary side of the DC/DC converter group 107. The EC 171 turns the FET 113 OFF for charging of the battery unit 151 and turns the FET 113 ON when the charging ends. During charging, the AC/DC adapter 101 supplies electricity to the DC/DC converter group 107. When the AC/DC adapter 101 abruptly stops the supplying of electricity, parasitic diode of the FET 113 temporarily supplies electricity and subsequently the CPU 181 of the EC 171 turns the FET 113 ON.

Figure 3:
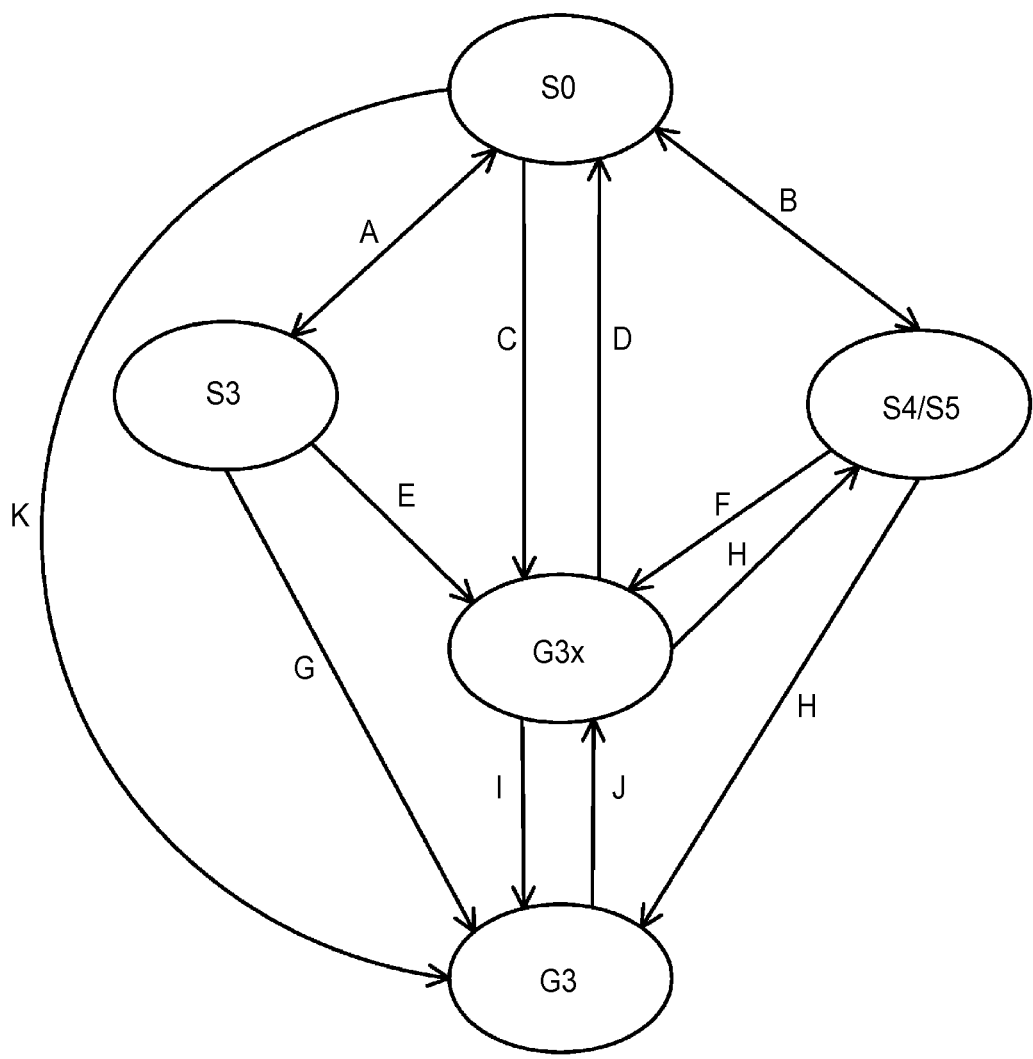
FIG. 3 shows transition of power states of the laptop PC 10.

The following describes power states of the laptop PC 10. FIG. 3 shows transition of the power states of the laptop PC 10. The laptop PC 10 has a power saving function specified by Advanced Configuration and Power Interface (ACPI), and transits to any one of S0 state (power-on state), S3 state (suspend state), S4 state (hibernation state) and S5 state (power-off state). The present embodiment defines S4 state and S5 state as the same power state, which may be different from each other.

Figure 6:
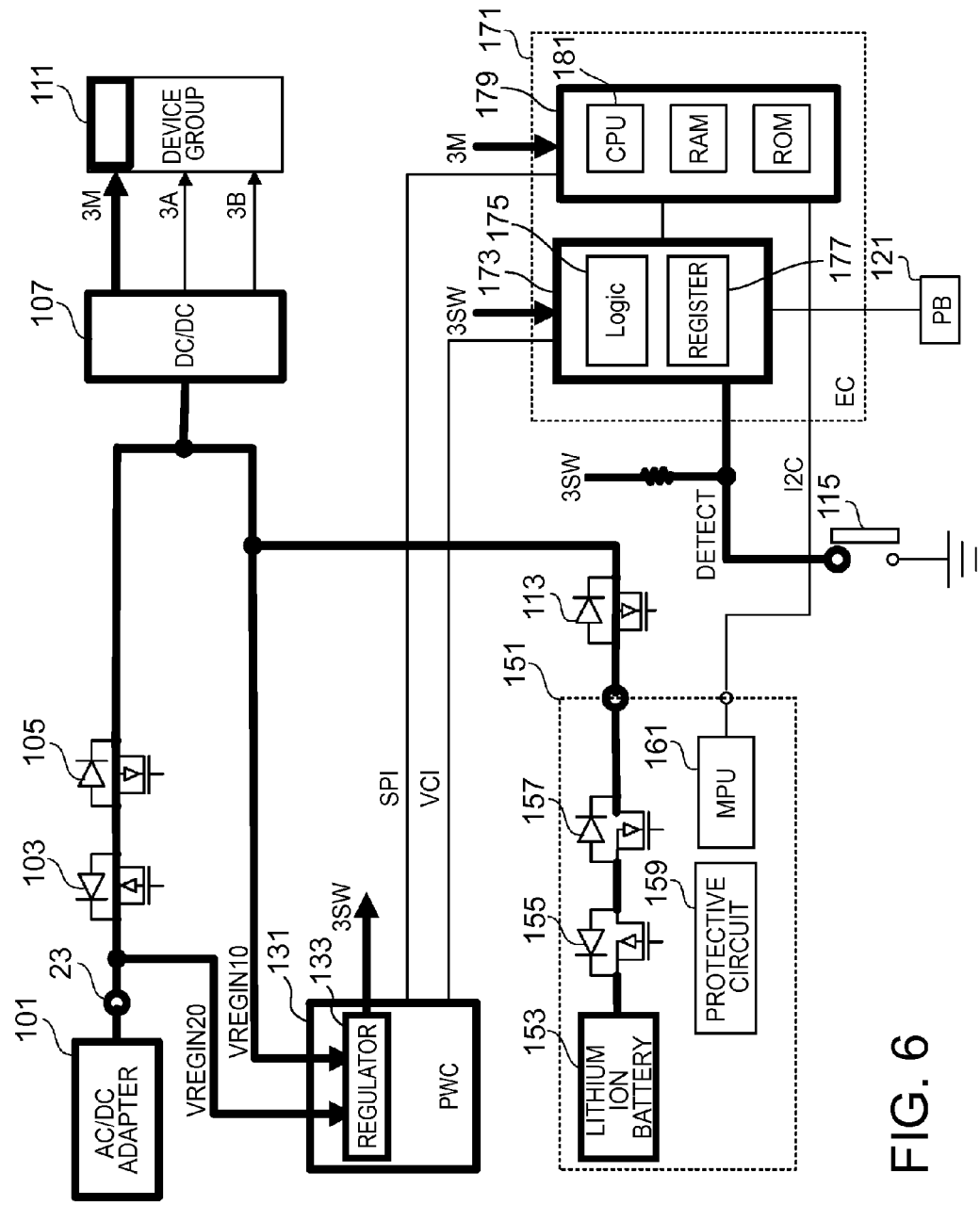
FIG. 6 shows the energization range at the S4/S5 state when an AC/DC adapter 101 is connected.

At the S4/S5 state, the energization state changes with the connection state of the AC/DC adapter 101. When the AC/DC adapter 101 is connected and charging is not performed, the FETs 103, 105 and 113 are ON. The energization range in this state is shown with bold lines in FIG. 6. The PWC 131 or the programmable block 179 controls the DC/DC converter group 107 so that the 3M system operates but the 3A system and the 3B system stop.

Figure 7:
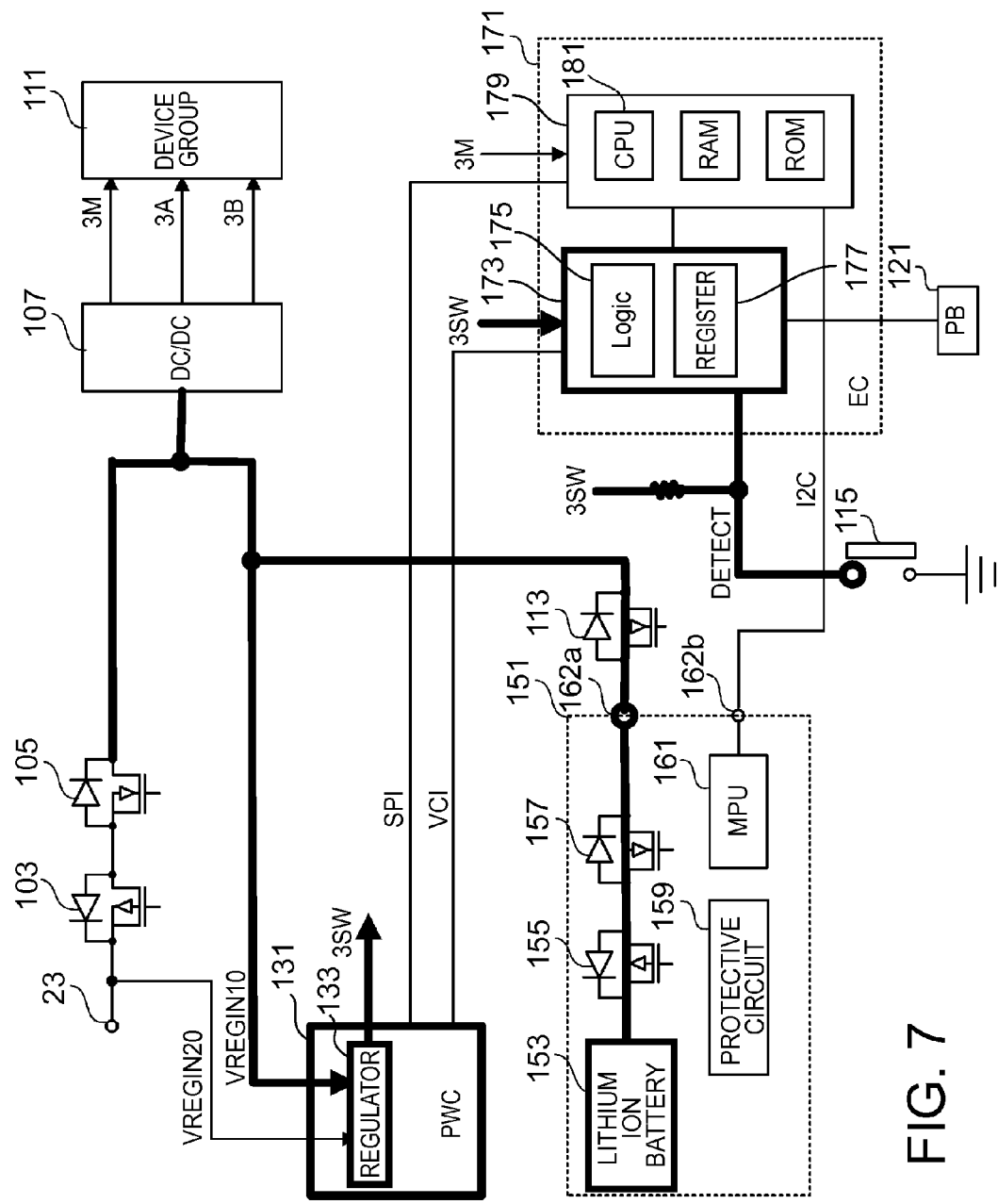
FIG. 7 shows the energization range at the S4/S5 state when an AC/DC adapter 101 is removed.

When the AC/DC adapter 101 is removed, the FETs 103 and 105 turn OFF, and the FET 113 turns ON. The energization range in this state is shown with bold lines in FIG. 7. The PWC 131 controls the DC/DC converter group 107 so that all of the 3M system, the 3A system and the 3B system stop the operation. At the S4/S5 state, the range up to the primary side of the DC/DC converter group 107 is energized, whether the AC/DC adapter 101 is connected or not, and the 3SW system also is energized. When the AC/DC adapter is connected, since the 3M system also is energized, a short-circuit accident may occur when the bottom cover 21 is opened for component replacement.

Figure 8:
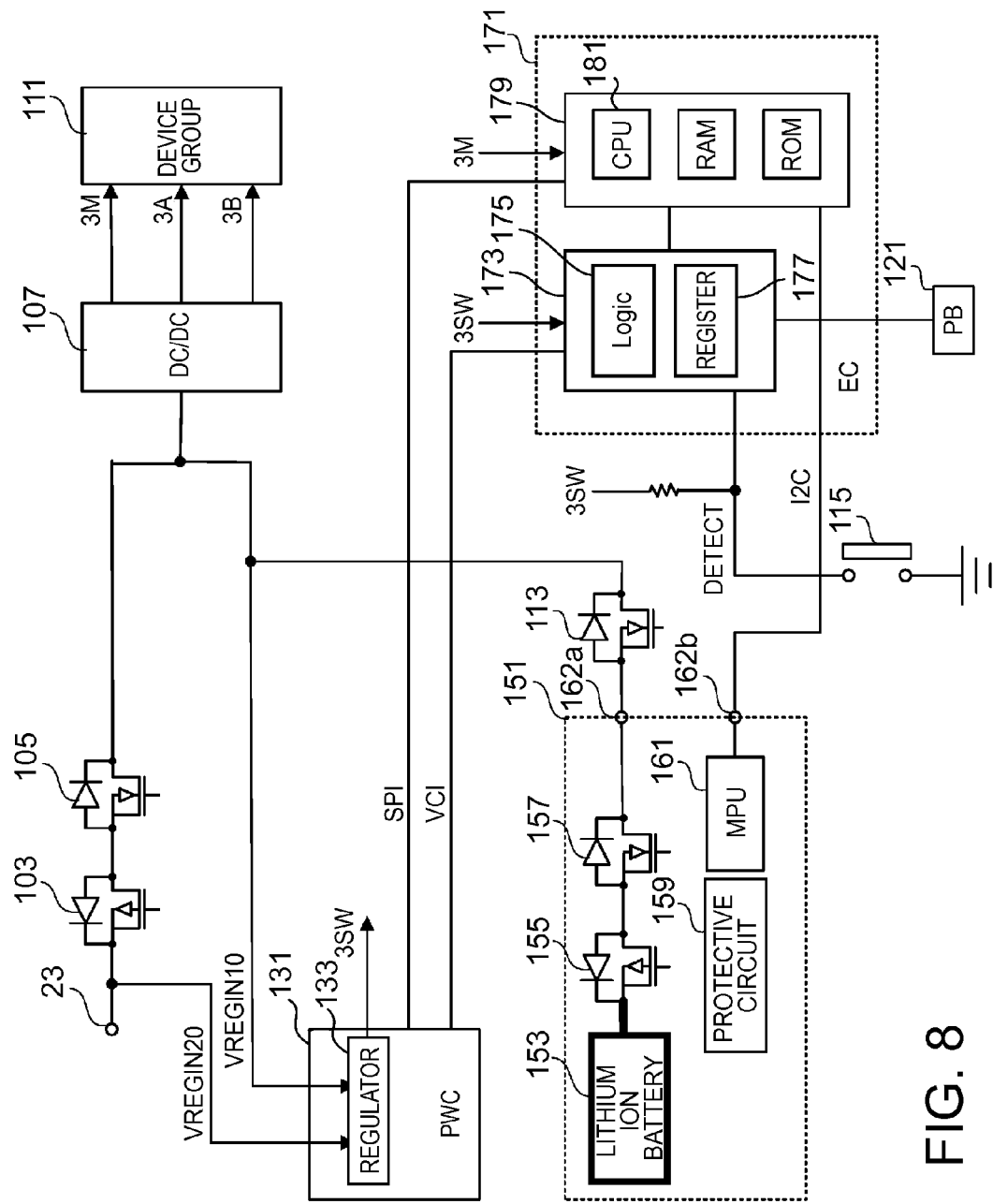
FIG. 8 shows the energization range at the G3 state.

Removal of the AC/DC adapter 101 from the jack 23 and control of the FET 155 of the battery unit 151 to be OFF allow the system transit to a G3 state (mechanical-off state) that is safer than the S4/S5 state. The energization range in the G3 state is shown with bold lines in FIG. 8. At the G3 state, since all power supplies other than a button battery as the power supply of a RTC (Real Time Clock) stop so that the system is not energized, a component can be replaced safely. The present embodiment defines a G3x state in addition to the G3 state, and in the G3x state, the AC/DC adapter 101 is connected and both of the FET 103 and the FET 155 of the battery unit 151 are OFF.

Figure 9:
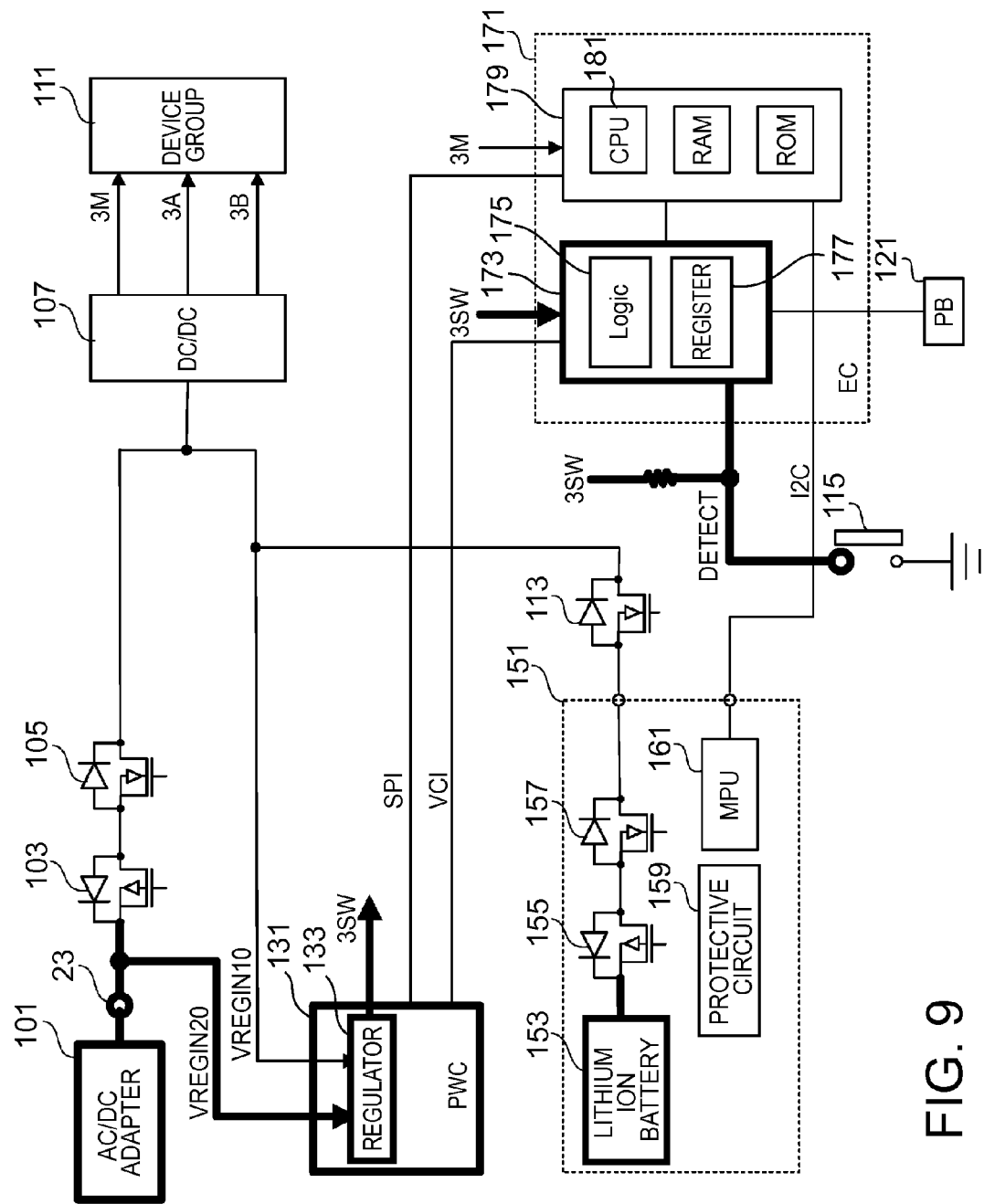
FIG. 9 shows the energization range at the G3x state.

The energization range at the G3x state is shown with bold lines in FIG. 9. At the G3x state, the PWC 131 and the 3SW system only become activated. At the G3x state, the energization range is narrower than that of the S4/S5 state when the AC/DC adapter 101 is not connected (FIG. 7), but is wider than that of the G3 state. Although it is desirable to remove the AC/DC adapter 101 before opening the bottom cover 21, even when the bottom cover 21 is opened while leaving the AC/DC adapter 101 connected for some reason, the risk of a short-circuit accident can be reduced at the G3x state. The G3x state can be a power state that temporarily appears during transition of the system from the G3 state to the S0 state.

At the S4/S5 state, pressing of the power button 121 makes the logic circuit 175 send a startup signal to the PWC 131 via the VCI line. The PWC 131 controls the DC/DC converter group 107 so as to make the system transit to the S0 state. At the G3 state, the programmable block 179 cannot send a command to the battery unit 151. At the G3x state, the FET 103 keeps the OFF state. In this way, at the G3 state and the G3x state, special devise is required because pressing of the power button 121 cannot make the system transit to the S0 state.

Figure 4:
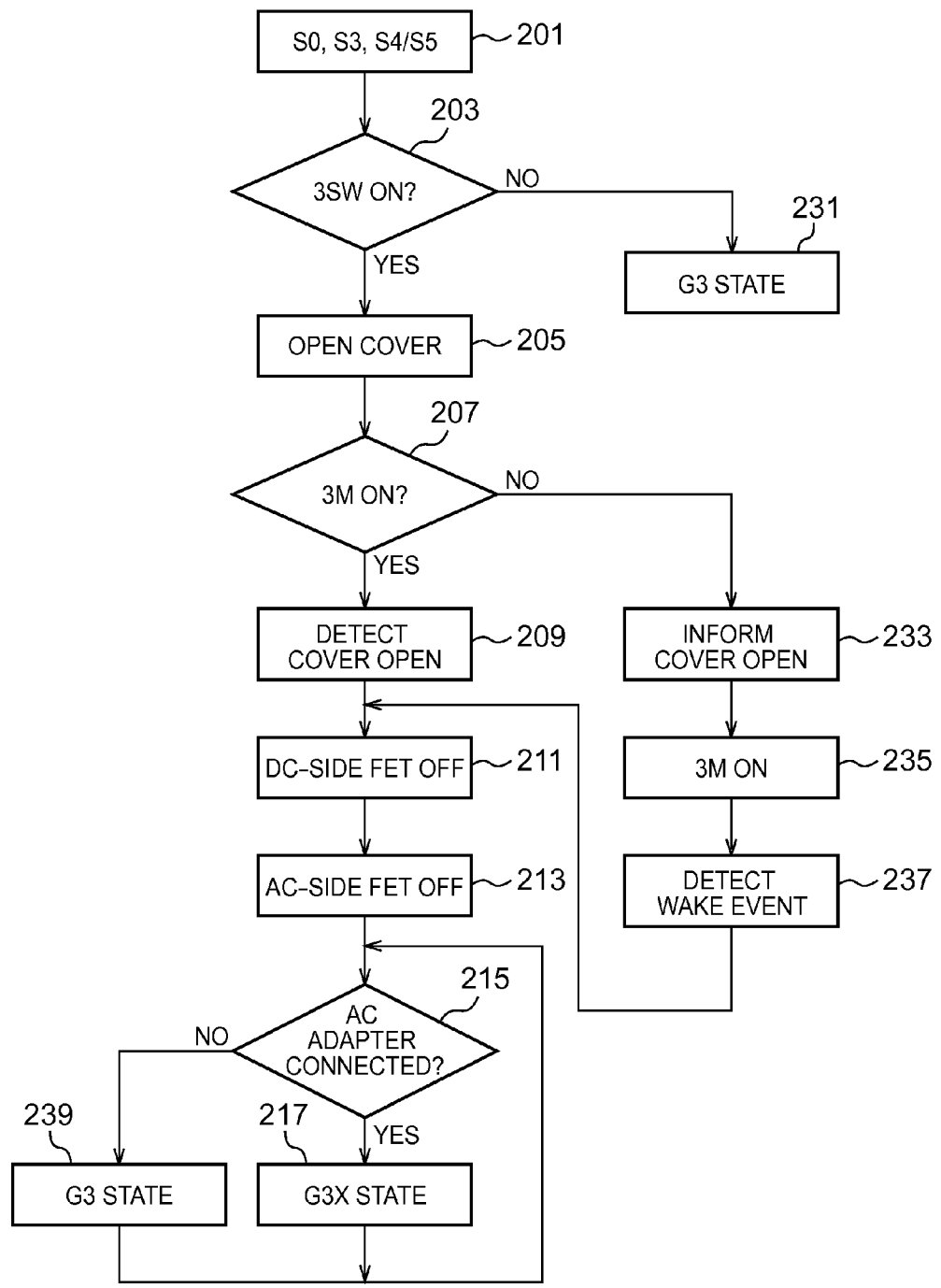
FIG. 4 is a flowchart showing the procedure to control the energization range for component replacement.
Figure 5:
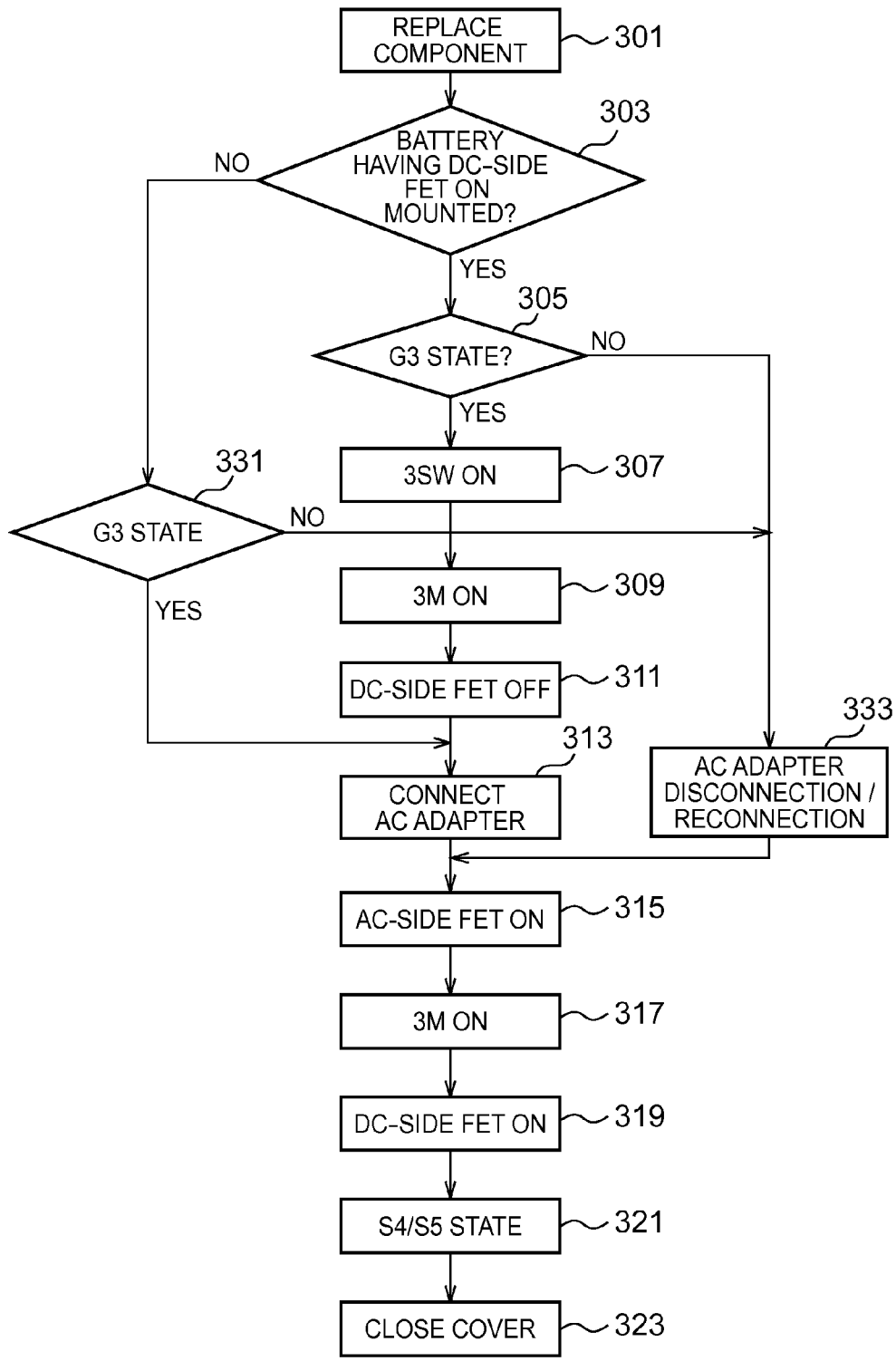
FIG. 5 is a flowchart showing the procedure to return the system to a power-off state after component replacement.

Referring now to FIGS. 4 and 5, the following describes a method to control the energization range of the laptop PC 10 when the bottom cover 21 is opened. FIG. 4 is a flowchart showing the procedure to make the system transit to the G3 state or G3x state. FIG. 5 is a flowchart showing the procedure to make the system transit from the G3 state or G3x state to the S4/S5 state.

At block 201, the bottom cover 21 is closed, and the system is at any one of power states including the S0 state, the S3 state and the S4/S5 state. The AC/DC adapter 101 is connected or disconnected. The FETs 103, 105, 113, 155 and 157 are all ON. The 3M system stops at the S4/S5 state and when the AC/DC adapter 101 is not connected, and becomes activated in other cases.

Since the bottom cover 21 is closed, the cover switch 115 is OFF. At any power state, the 3SW system is activated, and so the logic of the DETECT line of the EC 171 is high. At block 203, when the 3SW system stops, the procedure shifts to block 231, and when the 3SW system continues the operation, the procedure shifts to block 205. The state of shifting to block 231 corresponds to the case where a user controls the FET 155 at the S0 state to be OFF via the setup screen of the BIOS and removes the AC/DC adapter 101, thereby making the system transit to the G3 state (transition K).

The G3 state is the safest state to open the bottom cover 21 for component replacement, and so the procedure ends. When the procedures shifts to block 205, any one of the AC/DC adapter 101 and the battery unit 151 supplies electricity to the linear regulator 133. At block 205, when the user opens the bottom cover 21, the cover switch 115 turns ON so that the logic of the DETECT line transits to LOW and the logic of the register 177 is set at LOW. At block 207, when the power supply of the 3M system is activated, the procedure shifts to block 209, and when it stops, the procedure shifts to block 233. The power supply of the 3M system is activated at the S0 state, the S3 state or the S4/S5 state when the AC/DC adapter 101 is connected. The 3M system stops at the S4/S5 state when the AC/DC adapter 101 is removed.

At block 209, the logic circuit 175 detects the falling edge of the potential at the DETECT line and informs the CPU 181 that the bottom cover 21 is opened. At block 211, when the CPU 181 sends a command to the battery unit 151 via the I2C bus, the MPU 161 turns the FET 155 OFF. At block 213, the CPU 181 instructs the PWC 131 to turn the FET 103 OFF via the SPI bus. Alternatively the CPU 181 may directly turn the FET 103 OFF.

At block 215, when the AC/DC adapter 101 is not connected, the procedure shifts to block 239, so that the system transits to the G3 state (transitions K, G, H). At block 215, when the AC/DC adapter 101 is connected, the procedure shifts to block 217, so that the system transits to the G3x state (transitions E, C, F). Subsequently when the AC/DC adapter 101 is removed at the G3x state, the system transits to the G3 state (transition I) and when the AC/DC adapter 101 is connected at the G3 state, the system transits to the G3x state (transition J).

At block 233, when the logic circuit 175 detects the falling edge of the potential at the DETECT line, the logic circuit 175 sets the logic of the VCI line HIGH. At block 235, the PWC 131 detects the rising edge of the potential at the VCI line, the PWC 131 sends a signal to the DC/DC converter group 107 to activate the 3M system. At this time, the battery unit 151 supplies electricity to the 3M system. Receiving electricity from the 3M system, the programmable block 179 performs power-on-reset at block 237. The CPU 181 that is reset firstly refers to the register 177 and then makes the PWC 131 check the connection state of the AC/DC adapter 101.

When the CPU 181 confirms the logic of the register 177 is LOW and the AC/DC adapter 101 is not connected, the procedure shifts to block 211, where the CPU 181 sends a command to the battery unit 151 to turn the FET 155 OFF. In the procedure of FIG. 4, the system at the S0 state, the S3 state or the S4/S5 state transits to any one of the G3 state or the G3x state automatically in response to the opening of the bottom cover 21.

At block 301 of FIG. 5, the bottom cover 21 is open, and during transition of the system to the G3 state or the G3x state, the user replaces a component. The power supply of the 3SW system is activated at the G3x state and stops at the G3 state. The power supply of the 3M system stops at both of the power states. The component replacement operation may be replacement of the battery unit 151. A new battery unit for replacement typically includes the FET 155 in the OFF state but may include the FET 155 in the ON state in some cases.

At block 303, when the battery unit including the FET 155 in the ON state is mounted, the procedure shifts to block 305. When the battery unit including the FET 155 in the OFF state is mounted, the procedure shifts to block 331. At block 305, when the power state there is the G3 state, the procedure shifts to block 307, and when the power state is the G3x state, the procedure shifts to block 333.

At block 307, when electricity is supplied from the battery unit replaced to the linear regulator 133 via the VREGIN10 line, the 3SW system becomes activated, so that the DETECT line turns the pull-up state. In response to the power-on-reset, the logic circuit 175 of the hardware block 173 firstly refers to the register 177. When the logic circuit 175 refers to the register 177 to confirm the bottom cover 21 is open, the logic circuit 175 sets the logic of the VCI line HIGH.

At block 309, when the PWC 131 detects the rising edge of the potential at the VCI line, the PWC 131 sends a signal to the DC/DC converter group 107 to activate the 3M system. At block 311, the CPU 181 performing power-on-reset confirms the logic of the register 177 is set at LOW, and makes the PWC 131 check the connection state of the AC/DC adapter 101 via the SPI line. When the AC/DC adapter 101 is not connected, assuming that the component replacement operation is not completely finished, the CPU 181 sends a command to the MPU 161 to turn the FET 155 OFF.

At block 331, when the current power state is the G3 state, the procedure shifts to block 313, and when it is the G3x state, the procedure shifts to block 333. Blocks 313 and 333 are for the operation by the user to connect the AC/DC adapter 101, and the procedure does not progress until the user performs any operation. At block 313, the user connects the AC/DC adapter 101 to the system at the G3 state to make the system transit to the G3x state (transition J). Since the FET 155 is OFF at this time, the battery unit 151 does not send out electricity, but the PWC 131 receiving electricity via the VREGIN20 line performs power-on-reset, and then the linear regulator 133 activates the 3SW system.

At a time before shifting to block 333, the AC/DC adapter 101 is connected but the FET 103 is OFF, and so the 3M system stops, meaning that the CPU 181 cannot turn the FET 103 ON. Since the PWC 131 receives electricity from the VREGIN20 line to turn the FET 103 OFF, it cannot turn the FET 103 ON without certain trigger. In the present embodiment, the AC/DC adapter 101 is once removed at the G3x state so as to make the system transit to the G3 state, and then the AC/DC adapter 101 is connected to make the system to the G3x state (transition J), thus performing power-on-reset of the PWC 131.

At block 315, the PWC 131 performs power-on-reset at block 313 or block 333 turns the FET 103 ON. At block 317, the PWC 131 sends a signal to the DC/DC converter group 107 to activate the 3M system. At block 319, the CPU 181 performing power-on reset at block 319 confirms the logic of the register 177 is set at LOW, and makes the PWC 131 check the connection state of the AC/DC adapter 101 via the SPI line.

Unlike the procedure at block 311, when the AC/DC adapter 101 is connected, assuming that the component replacement operation is completely finished and energization is performed on a trial basis, the CPU 181 sends a command to the MPU 161 to turn the FET 155 ON. As a result, when the user connects AC/DC adapter 101, the system having the bottom cover 21 open transits to the S0 state, whereby the user can check the result of the component replacement. At block 321, the system transits to the S4/S5 state (transition L). At block 323, the user closes the bottom cover 21, so that the cover switch 115 returns to the open state.

Instead of the present embodiment, a cover switch configured to turn OFF when the bottom cover 21 is opened may be inserted on the primary side of the FET 103 and on the output side of the battery unit 151. In this case, when the bottom cover 21 is opened, the system can be brought to a state closer to the G3 state than to the G3x state. Such a method, however, requires an additional switch circuit, and if the switch breaks, electricity cannot be supplied to the system and the reliability of the power supply deteriorates, and so such a method is not used in the present embodiment.

In the present embodiment, if the cover switch 115 breaks in a mode of keeping the OFF state after opening the bottom cover 21, the system cannot transit to the G3 state or to the G3x state automatically in response to the opening of the bottom cover 21. However, the operation of the system can be continued. When the cover switch 115 breaks in a mode of turning ON when the bottom cover 21 is closed, the logic of the DETECT line transits to LOW when the bottom cover 21 is closed, but the rising edge of the potential does not occur, and so the system can transit to the S4/S5 state by the procedure of block 313 or block 333 or later.

At block 333, the power-on-reset of the PWC 131 is performed in response to the reconnection of the AC/DC adapter 101. Alternatively, in response to the pressing of the power button 121, the hardware block 173 may send a reset signal to the PWC 131. Alternatively, a reset button may be connected to the PWC 131. That is a description exemplifying an internal battery unit 151, and an embodiment can be applied to a laptop PC coming with a battery unit mounted at a bay as well.

The above describes an example of storing the hardware block 173 connected to the DETECT line in the EC 171. Alternatively, the hardware block 173 may be an independent circuit or may be incorporated in the PWC 131. That is the description of the present embodiment by way of specific embodiments illustrated in the drawings. However, the present embodiment is not limited to the embodiment illustrated in the drawings, and any known configuration can be used as long as it has the advantageous effects of the present embodiment.

What is claimed is:

1. An electronic device, comprising:
a housing comprising a detachable housing cover;
an electrical circuit that facilitates power between a battery pack and the electronic device;
a first control circuit electrically disposed between the battery pack and the electrical circuit and independently operable from the electrical circuit, the first control circuit connectable to a software controlled DC-side switch of the battery pack, wherein the DC-side switch prevents energization of the device via battery power when in an OFF state by preventing power transference from the battery pack to the electrical circuit;
a cover switch that detects, in a device power-off state, the opening of the detachable housing cover with respect to the housing;
a startup power supply of the first control circuit that supplies electricity to the first control circuit, wherein the first control circuit shifts the DC-side switch to the OFF state as a function of electricity being received from the startup power supply in response to opening of the cover switch and wherein the electronic device is transitioned to a mechanical-off state by the DC-side switch shifting to the OFF state and wherein the first control circuit remains powered as a function of the DC-side switch being in the OFF state and wherein while in the mechanical-off state no power is supplied to the electrical circuit.

2. The electronic device of claim 1, wherein the electronic device includes an internal battery pack stored inside of the housing.

3. The electronic device of claim 1, wherein the electronic device includes a bay for storing the battery pack.

4. The electronic device of claim 1, wherein the DC-side switch is controlled by a software system.

5. The electronic device of claim 1, wherein, when a battery is mounted with the DC-side switch in an ON state, the first control circuit controls the DC-side switch to the OFF state.

6. The electronic device of claim 1, further comprising:
an external power supply connection for connecting an external power supply; and
an AC-side switch, connected to the external power supply connection, that controls electricity supplied by the external power supply, wherein the AC-side switch shifts to an OFF state in response to an operation of the cover switch.

7. The electronic device of claim 6, wherein when the housing cover is open, the external power supply is removed, and the DC-side switch is present, the first control circuit controls the DC-side switch to be in the OFF state.

8. The electronic device of claim 6, further comprising:
a second control circuit that receives electricity from the external power supply, wherein the startup power supply is activated in response to an operation of the cover switch when the AC-side switch is in the OFF state.

9. The electronic device of claim 8, wherein when the housing cover is open and a battery pack including the DC-side switch in the OFF state is mounted, and subsequently when the external power supply is connected, the second control circuit controls the AC-side switch to be in the ON state.

10. The electronic device of claim 8, wherein when the external power supply is connected while the housing cover is open, and when the external power supply is subsequently removed and is then reconnected, the second control circuit controls the AC-side switch to be in the ON state.

11. A method, comprising:
transitioning an electronic device to a power-off state;
detecting, using a cover switch, that a detachable housing cover has been opened with respect to a housing of the electronic device in the power-off state;
receiving, from a startup power supply of a first control circuit, electricity to the first control circuit, wherein the first control circuit is electrically disposed between a battery pack and an electrical circuit and is independently operable from the electrical circuit, wherein the electrical circuit facilitates power between the battery pack and the electronic device; and
operating, in response to the detecting, the first control circuit to shift a software controlled DC-side switch to an OFF state;
wherein the DC-side switch prevents energization of the electronic device via battery power by preventing power transference from the battery pack to the electrical circuit when in an OFF state and wherein the electronic device is transitioned to a mechanical-off state by the DC-side switch shifting to the OFF state and wherein the first control circuit remains powered as a function of the DC-side switch being in the OFF state and wherein while in the mechanical-off state no power is supplied to the electrical circuit.

12. The method of claim 11, wherein the battery pack is an internal battery pack stored inside of the housing.

13. The method of claim 11, wherein the battery pack is stored in a bay of the housing of the electronic device.

14. The method of claim 11, wherein the DC-side switch of the battery pack is controlled by a software system.

15. The method of claim 11, wherein the detecting comprises detecting that a battery pack including a DC-side switch in the ON state is mounted to the housing, wherein the operating comprises operating the first control circuit to control the DC-side switch to the OFF state.

16. The method of claim 11, further comprising:
detecting an external power supply is connected to the electronic device;
utilizing the external power supply to supply electricity to the electronic device; and
removing, with an AC-side switch, electricity supplied by the external power supply when in an OFF state, wherein the AC-side switch shifts to an OFF state in response to an operation of the cover switch.

17. The method of claim 16, wherein when the housing cover is open, the external power supply is removed, and the battery unit including the DC-side switch is detected, the operating comprises operating first control circuit to control the DC-side switch to be in the OFF state.

18. The method of claim 16, further comprising:
operating a second control circuit of the electronic device to receive electricity from the external power supply, wherein a startup power supply is activated in response to an operation of the cover switch when the AC-side switch is in the OFF state.

19. The method of claim 18, wherein when the external power supply is not connected while the housing cover is open and a battery pack including the DC-side switch in an OFF state is mounted to the housing, and subsequently when the external power supply is connected to the electronic device, the second control circuit controls the AC-side switch to be in an ON state.

20. An electronic device, comprising:

a housing comprising a detachable housing cover;

a battery pack disposed within the housing;

an electrical circuit that facilitates power between a battery pack the electronic device;

a first control circuit electrically disposed between the battery pack and the electrical circuit and independently operable from the electrical circuit, the first control circuit connectable to a software controlled DC-side switch of the battery unit, wherein the DC-side switch prevents energization of the device via battery power when in an OFF state by preventing power transference from the battery pack to the electrical circuit;

a cover switch that detects, in a power-off state, the opening of the detachable housing cover with respect to the housing;

a startup power supply of the first control circuit that supplies electricity to the first control circuit, wherein the first control circuit shifts the DC-side switch to an OFF state as a function of electricity being received from the startup power supply in response to opening of the cover switch and wherein the electronic device is transitioned to a mechanical-off state by the DC-side switch shifting to the OFF state and wherein the first control circuit remains power as a function of the DC-side switch being in the OFF state and wherein while in the mechanical-off state no power is supplied to the electrical circuit;

an external power supply connection for connecting an external power supply; and an AC-side switch, operatively coupled to the external power supply connection, that controls electricity supplied by the external power supply, wherein the AC-side switch shifts to an OFF state in response to opening of the cover switch.

* * * * *